(12) United States Patent
Freedman

(10) Patent No.: US 10,626,843 B2
(45) Date of Patent: Apr. 21, 2020

(54) HYBRID HEAT ENGINE

(71) Applicant: Job Freedman, Salt Lake City, UT (US)

(72) Inventor: Job Freedman, Salt Lake City, UT (US)

(*) Notice: Subject to any disclaimer, the term of this patent is extended or adjusted under 35 U.S.C. 154(b) by 187 days.

(21) Appl. No.: 15/912,175

(22) Filed: Mar. 5, 2018

(65) Prior Publication Data

US 2019/0271294 A1  Sep. 5, 2019

(51) Int. Cl.
*F03B 17/00* (2006.01)
*F01K 23/10* (2006.01)
*F01K 13/02* (2006.01)
*F01K 9/02* (2006.01)

(52) U.S. Cl.
CPC .......... *F03B 17/005* (2013.01); *F01K 9/023* (2013.01); *F01K 13/02* (2013.01); *F01K 23/108* (2013.01); *Y02E 20/16* (2013.01); *Y02P 80/154* (2015.11)

(58) Field of Classification Search
CPC ........ F03B 17/005; F03B 13/00; F01K 9/023; F01K 13/02; F01K 23/108; F05B 2210/13; Y02E 20/16; Y02P 80/154
See application file for complete search history.

(56) References Cited

U.S. PATENT DOCUMENTS

| 4,370,860 A * | 2/1983 | Assaf ..................... F03G 3/00 60/641.11 |
| 4,430,861 A | 2/1984 | Avery |
| 5,202,417 A | 4/1993 | Hayashi |
| 5,488,828 A | 2/1996 | Brossard |
| 6,094,914 A * | 8/2000 | Zorner ..................... F01D 19/02 60/643 |
| 6,412,281 B2 | 7/2002 | Cover |
| 8,047,808 B2 | 11/2011 | Kondo |
| 9,220,996 B2 * | 12/2015 | Xu .......................... B01D 5/0027 |
| 10,273,168 B2 * | 4/2019 | Riley ........................ C02F 1/048 |
| 2010/0199667 A1 * | 8/2010 | Ullman ................... F01K 27/005 60/641.2 |
| 2010/0275599 A1 | 11/2010 | Glynn |
| 2013/0031903 A1 | 2/2013 | Van Ryzin et al. |
| 2015/0285227 A1 | 10/2015 | Wei |
| 2016/0108899 A1 | 4/2016 | Favy |
| 2016/0312646 A1 | 10/2016 | Juano |
| 2016/0363114 A1 | 12/2016 | Johnson |

OTHER PUBLICATIONS

International Search Report and Written Opinion dated Apr. 30, 2019, on application No. PCT/US2019/020818.

* cited by examiner

*Primary Examiner* — Michael C Zarroli

(57) ABSTRACT

One heat engine includes a hydro-electric turbine, a steam source configurable to generate steam from a hot water source, a condenser, and a slug intake bend in a first pipe coupled between the steam source and the condenser. The slug intake bend is configurable to receive a slug of water from a cold water source. The steam from the hot water source pushes the slug of water up a vertical distance to the condenser. The condenser is configurable to receive the slug of water and the steam and provide liquid water from the slug of water and steam to power the hydro-electric turbine.

20 Claims, 7 Drawing Sheets

HYBRID HEAT ENGINE

BACKGROUND

A heat engine is a system that converts thermal energy to mechanical energy to produce work. A heat engine may include a heat source, a heat sink, and a working fluid. Efficiency of the heat engine may be increased by increasing the temperature difference between the heat source and the heat sink and by exploiting properties of the working fluid.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

DETAILED DESCRIPTION

Figure 1:
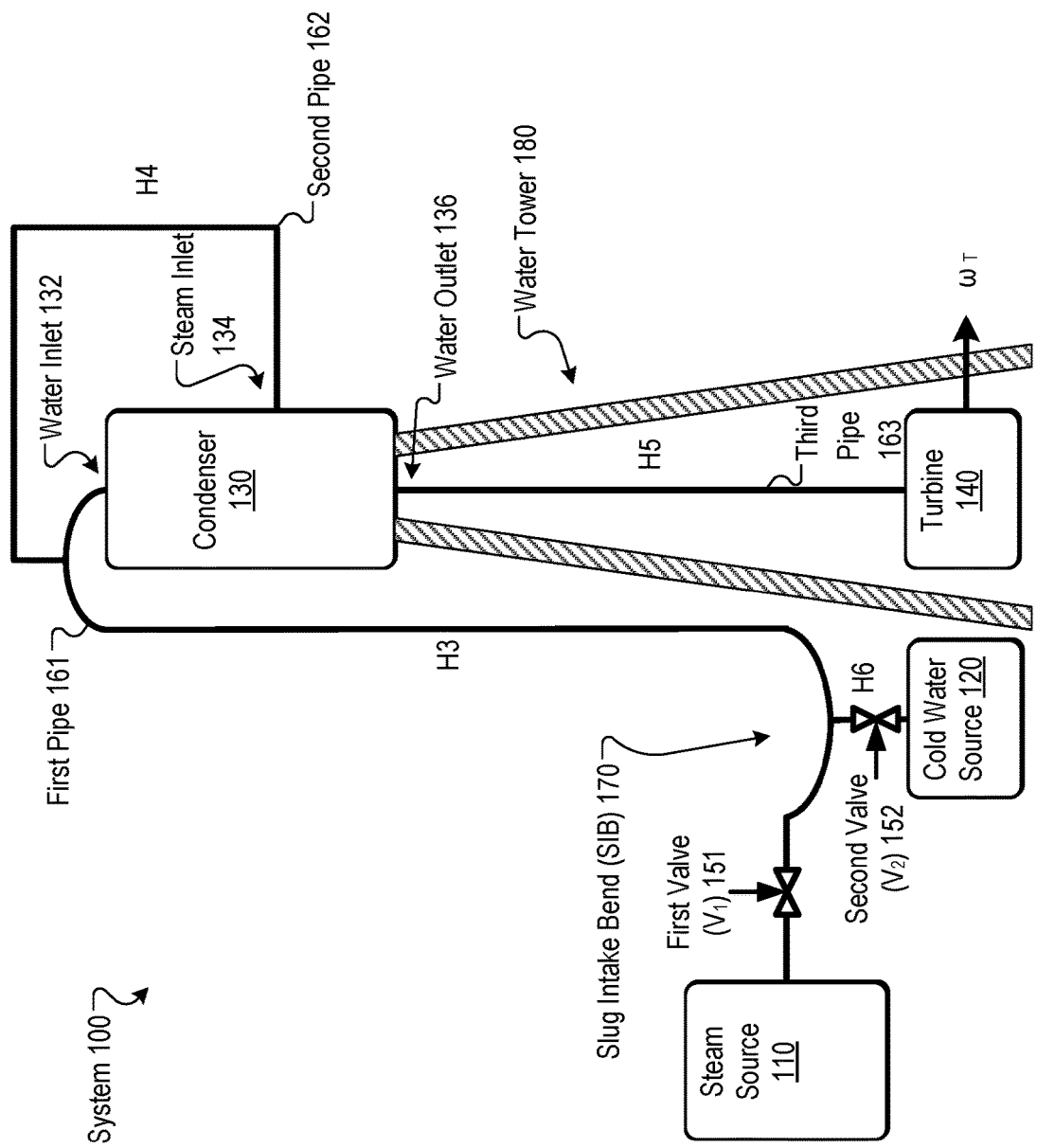
FIG. 1 is a schematic diagram illustrating a system to generate electrical power, according one embodiment.

A heat engine may bring a working fluid from a higher state temperature to a lower state temperature to convert thermal energy to mechanical energy to do mechanical work. A heat source may generate thermal energy that brings the working fluid to the high temperature state. The working fluid may generate work in the heat engine while transferring heat to a heat sink until the working fluid reaches the low temperature state. Thermal energy may be converted into work by exploiting the properties of the working fluid. Increasing the temperature differential between the heat source and the heat sink increases the thermal efficiency of the heat engine. The heat sink of heat engines is generally limited to being close to the ambient temperature of the environment, so most efforts to improve the thermal efficiency of heat engines focus on increasing the temperature of the heat source. Conventional heat engines use high-temperature heat sources and large temperature differentials between the heat source and the heat sink. The temperature of conventional heat engines are limited by the melting points of the materials that make up the heat engine, environmental concerns (e.g., limits on oxides of nitrogen (NOx) production, etc.), availability of high-temperature heat sources, etc. Conventional heat engines cannot efficiently extract energy from low-temperature heat sources. Conventional heat engines cannot efficiently extract energy from working fluid once the working fluid reaches a threshold temperature. This leads to wasted energy and a waste disposal problem.

Described herein are technologies of a heat engine that transform a low-level temperature differential between a heat source and a heat sink into useful electrical power. One heat engine includes a hydro-electric turbine, a steam source configurable to generate steam from a hot water source, a condenser, and a slug intake bend (SIB) in a first pipe coupled between the steam source and the condenser. The SIB is configurable to receive a slug of water from a cold water source. The steam from the hot water source pushes the slug of water up a vertical distance to the condenser. The condenser is configurable to receive the slug of water and the steam, mix the slug of water with the steam to generate liquid water, and power a turbine with the liquid water.

By using low-level temperature differentials between a heat source and a heat sink, the heat engine described herein can produce electrical power from low-temperature heat sources (e.g., waste liquid from mechanical processes) that were previously unused by conventional heat engines. The heat engine described herein may not require lowering temperature of the heat sink below ambient temperature. The heat engine described herein may not be limited by melting points of materials that make up the heat engine and may not require materials that have as high of melting points as conventional heat engines. The heat engine described herein may have a better impact on the environment than conventional heat engine by extracting energy from low-temperature heat sources (e.g., waste water).

The systems described herein utilize a working fluid to generate electrical power. As described herein, the working fluid may be water. Although the disclosure refers to water, other working fluids may be used. For example, the working fluid may be a refrigerant (e.g., ammonia).

FIG. 1 is a schematic diagram illustrating a system 100 to generate electrical power, according one embodiment. System 100 may be a heat engine that transforms a low-level temperature differential between a heat source and a heat sink into useful electrical power. System 100 may be a hybrid heat engine. A hybrid heat engine may produce electric power from a lower temperature heat source, For example, a hybrid heat engine may combine characteristics of a steam engine and a power plant (e.g., hydropower plant) to economically produce electric power from a low temperature heat source.

System 100 may be coupled to a steam source 110 and a cold water source 120. The steam source 110 may be configurable to generate steam from a hot water source. System 100 may include a condenser 130. In some embodiments, system 100 is coupled to a turbine 140. In some embodiments, system 100 includes turbine 140. The turbine 140 may be a hydro-electric turbine. The turbine 140 may be a high-pressure turbine. System 100 may include valves 150 including a first valve 151 and a second valve 152. The system 100 may include pipes 160 including a first pipe 161, a second pipe 162, and a third pipe 163. The first pipe 161 may include a slug intake bend (SIB) 170. The system 100 may include a water tower 180.

The steam source 110 may be located at a first height. The steam source 110 may provide steam to an input of the first valve 151.

In some embodiments, the condenser 130 is a jet condenser. In some embodiments, the condenser 130 is a surface condenser. In some embodiments, the condenser is an air-cooled condenser. For example, if the ambient temperature is very low (e.g., the condenser 130 is outside in the winter in a cold climate), an air condenser may be used. The condenser 130 may be disposed at a top end of a water tower 180. The condenser 130 may have a water inlet 132, a steam inlet 134, and a water outlet 136. The condenser 130 may be located at a second height that is at a higher elevation than the first height of the steam source 110.

The first pipe 161 may be coupled between the steam source 110 and the water inlet 132 of the condenser 130. The second pipe 162 may be coupled between a top portion of the first pipe 161 and the steam inlet 134 of the condenser 130.

A second valve 152 may be coupled to the SIB 170 and the cold water source 120. The second valve 152 may be controlled to inject a first amount of cold water from the cold water source 120 into the SIB 170. The first valve 151 may be controlled to inject the steam into the first pipe 161. The steam may push the first amount of cold water as a slug of water through a vertical portion of the first pipe 161 upwards to the water inlet 132 of the condenser 130. The vertical portion may correspond to the second height of the water tower 180. The steam in the first pipe 161 may enter the second pipe 162 to be input into the steam inlet 134 of the condenser 130.

The third pipe 163 may be coupled between the water outlet 136 of the condenser 130 and an input of the turbine 140 that is located at a lower elevation than the condenser 130. The cold water received by the condenser 130 via the water inlet 132 and the steam received by the condenser 130 via the steam inlet 134 may mix in the condenser 130. The cold water may condense the steam in the condenser 130. The liquid water (e.g., cold water and steam that is condensed by the cold water) in the condenser 130 may flow (e.g., fall) through the third pipe 163 to the input of the turbine 140 responsive to being output from the water outlet 136 of the condenser 130. The third pipe 163 may be a vertical pipe coupled to a bottom of the condenser 130 and a top portion of the turbine 140. The liquid water may spin the turbine 140 to generate electrical power. Electrical power ($\omega_T$) may be the work of the turbine 140 over time (e.g., rate of the work of the turbine 140).

Figure 2:
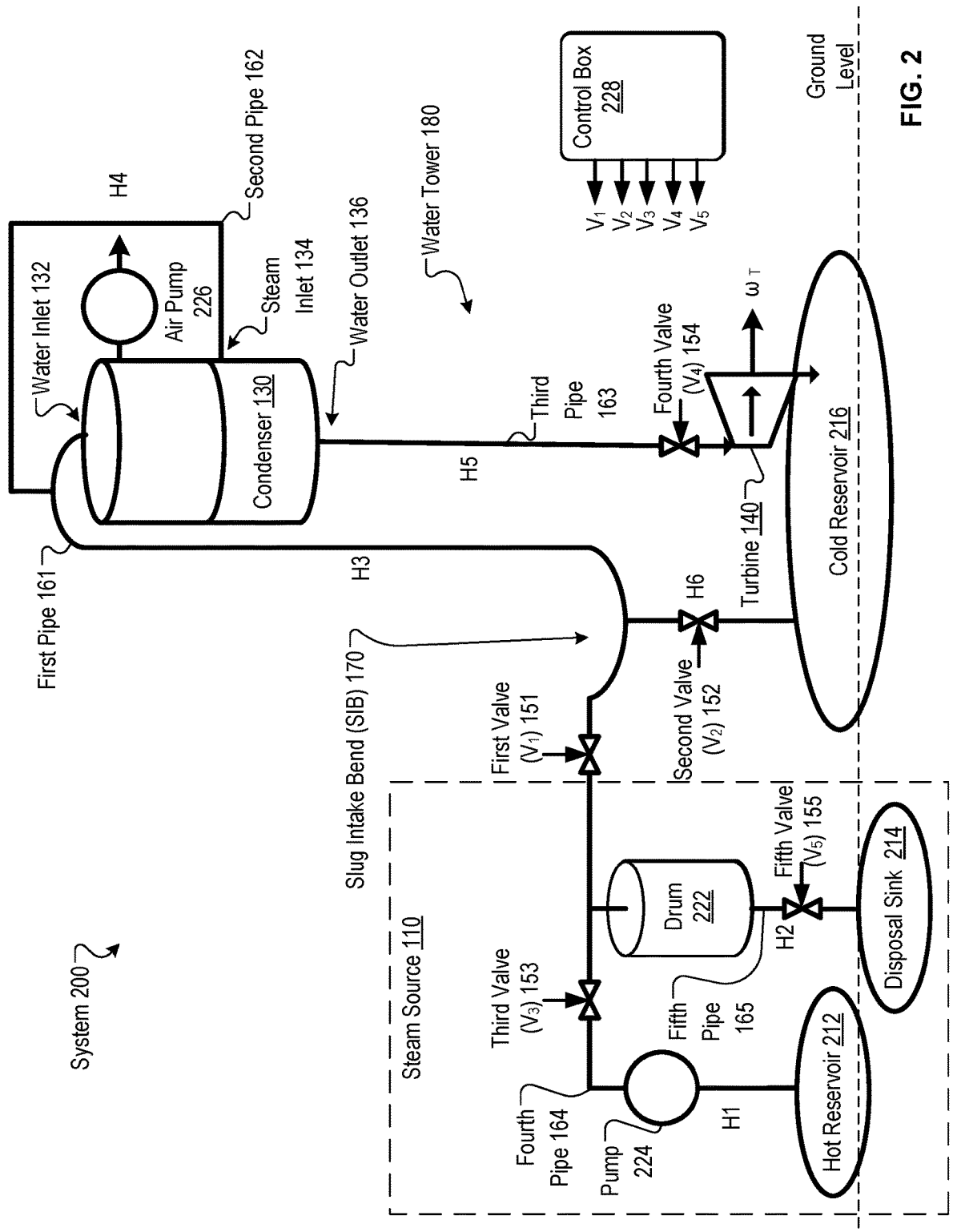
FIG. 2 is a schematic diagram illustrating a system to generate electrical power, according another embodiment.

FIG. 2 is a schematic diagram illustrating a system 200 to generate electrical power, according another embodiment. Elements in FIG. 2 that have a similar reference number as elements in FIG. 1 may include similar features and similar functionality as the elements described in relation to FIG. 1. System 200 may be a heat engine that transforms a low-level temperature differential between a heat source and a heat sink into useful electrical power. System 200 may be a hybrid heat engine. A hybrid heat engine may produce electric power from a lower temperature heat source, For example, a hybrid heat engine may combine characteristics of a steam engine and a power plant (e.g., hydropower plant) to economically produce electric power from a low temperature heat source.

System 200 may be coupled to a hot reservoir 212 (e.g., a steam source 110), a disposal sink 214, and a cold reservoir 216. System 200 may include or may be coupled to a drum 222 and a pump 224. System 200 may include an air pump 226 (e.g., vacuum pump) and control box 228. System 200 may include one or more of a first valve 151, a second valve 152, a third valve 153, a fourth valve 154, or a fifth valve 155. System 200 may include one or more of a first pipe 161, a second pipe 162, a third pipe 163, a fourth pipe 164, or a fifth pipe 165.

System 200 may be a heat engine that is coupled to a heat source and a heat sink. The heat engine may include a working fluid and may generate electrical power.

The heat sink may be the cold reservoir 216 (e.g., cold water source 120, reservoir of cold water). The cold reservoir 216 may be located at a base of the turbine 140. The cold reservoir 216 may be a large reservoir of water that is cooled by direct exposure to the atmosphere and other surroundings. Cooling water and condensate from the turbine 140 may pass (e.g., be output) to the cold reservoir 216 (e.g., after use) where the cooling water and condensate is cooled to the temperature of the cold reservoir 216 by convection and evaporation. In one embodiment, the cold reservoir 216 is a natural body of water (e.g., lake, pond, ocean, river, stream, etc.) that is exposed to the atmosphere. In another embodiment, the cold reservoir 216 is a man-made body of water (e.g., a cooling pond, etc.) that is exposed to the atmosphere. In another embodiment, the cold reservoir 216 may include a liquid that is not water. For example, the cold reservoir 216 may include a refrigerant (e.g., ammonia). The cold reservoir 216 may include water with gas dissolved in the water at pressure (e.g., $P_{atm}$) higher than the pressure of the condenser (e.g., $P_{condenser}$). The water in the cold reservoir 216 may or may not be in a saturated state, but the non-condensable gases may remain dissolved until the pressure is reduced below a threshold pressure.

In one embodiment, the working fluid is water. In another embodiment, the working fluid is a refrigerant. For example, the working fluid may be ammonia. The working fluid may include gas (e.g., non-condensable gases) dissolved in the working fluid at the original pressure of the working fluid (e.g., $P_{atm}$). As the pressure is reduced below the original pressure (e.g., reduced towards $P_{condenser}$), the gas (e.g., non-condensable gases) may bubble out of the working fluid. The working fluid may be extracted from the cold reservoir 216 and expelled to the cold reservoir 216 (e.g., the working fluid and the fluid in the cold reservoir 216 may be the same fluid).

The heat source may be the hot reservoir 212. The hot reservoir 212 may be part of the steam source 110. In one embodiment, the hot reservoir 212 includes waste water that is at a higher temperature than the cold reservoir 216. In one example, the waste water is from a processing plant. In another example, the waste water is from an oil refinery. In another embodiment, the hot reservoir 212 includes co-produced water from an oil platform (e.g., offshore platform, oil rig). In another example, the hot reservoir 212 includes cooling water that has been heated by a power plant. In another embodiment, the hot reservoir 212 includes exhaust from a power plant. In another embodiment, the hot reservoir 212 includes brackish water.

In one embodiment, a power plant may use multiple stages to extract energy from a working fluid or exhaust. The power plant may use system 200 to extract energy from a working fluid or exhaust subsequent to a first system extracting energy from the working fluid or exhaust. For example, a power plant (e.g., combined cycle power plant) may use a reciprocating engine to generate electrical power from working fluid or exhaust, may then use the exhaust output from the reciprocating engine to run a steam turbine to generate energy, and then may use system 200 to extract more energy from the exhaust output from a heat exchanger that heats the working fluid that goes into the steam turbine. By using system 200, a power plant may achieve higher efficiency and waste less energy.

In one embodiment, the hot reservoir 212 may be at a lower elevation (e.g., at the bottom of a hill or mountain) and the liquid water from the condenser 130 is at a higher elevation (e.g., at the top of a hill or mountain) than the hot reservoir 212. The liquid water may be at least a threshold distance below the condenser (e.g., 10 meters (m)). The turbine 140 may be at a lower elevation than the liquid water. The liquid water from the condenser 130 may be stored at the higher elevation and may be allowed to flow down to the turbine 140 at the lower elevation to generate electrical power.

The water in the hot reservoir 212 may be at a first temperature ($T_H$) and a saturation pressure ($P_{H,sat}$) or atmospheric pressure ($P_{atm}$). In some embodiments, the pump 224 may pump water from the hot reservoir 212 into the drum 222 and may increase the pressure of the water to a pressure ($P_H$) that is above $P_{H,sat}$ (at the beginning of each cycle). In some embodiments, hot water at a pressure ($P_H$) higher than $P_{H,sat}$ is being provided to the drum 222 (at the beginning of each cycle). The drum 222 may throttle the water to a pressure ($P_{drum}$) that is lower than $P_{H,sat}$. By throttling the water to $P_{drum}$, some of the liquid water changes to steam to expand up the pipe. Water in the cold reservoir 216 may be at atmospheric pressure ($P_{atm}$) and at a second temperature (TO that is less than $T_H$ (e.g., $T_C$=30 degrees Celsius (° C.) and $T_H$=100° C.).

The air pump 226 (e.g., a vacuum pump) may pump air (e.g., non-condensable gases) out of the condenser 130 to maintain the condenser 130 at a pressure ($P_{condenser}$) that is less than $P_{atm}$. The condenser 130, SIB 170, and first pipe 161 may all be at $P_{condenser}$. The air pump 226 may create a vacuum in the first pipe 161 (e.g., to suction cold water from the cold water source 120 to the SIB 170, etc.). The air pump 226 may expel the non-condensable gases in the condenser 130 to the atmosphere (e.g., by bringing the non-condensable gases to a pressure exceeding atmospheric pressure). Non-condensable gases may include hydrogen sulphide, methane, etc. In some embodiments, the non-condensable gases are filtered as they are expelled from the condenser 130. In some embodiments, the non-condensable gases are discarded after being expelled from the condenser 130. In some embodiments, the non-condensable gases are burned after being expelled from the condenser 130. The burning of the non-condensable gases may be used to provide extra heat. For example, the extra heat can be used for heating the hot reservoir 212.

The steam source 110 may include a drum 222, a pump 224, a third valve 153, and a fifth valve 155. The steam source 110 may be coupled to a hot reservoir 212 and a disposal sink 214.

Hot water may be at $T_H$ and $P_{H,sat}$ (e.g., 212 degrees Fahrenheit (° F.) and 1 atmosphere (atm)) in the hot reservoir 212. A first amount of the hot water may be pumped by pump 224 from the hot reservoir into the drum 222 (with the third valve 153 open, the first valve 151 closed, and the fifth valve 155 closed). The first amount of the hot water may be pumped into the drum 222 at $P_H$, where $P_H$ is greater than $P_{H,sat}$ (e.g., $P_{H,sat}$ is 1 atm and $P_H$ is greater than 1 atm). Responsive to the first amount of hot water entering the drum 222, the third valve 153 may close. The hot water in the drum 222 is pressurized (at $P_{H,sat}$). The drum 222 may throttle the water to a pressure ($P_{drum}$) that is lower than $P_{H,sat}$. By throttling the water to $P_{drum}$, some of the liquid water changes to steam to expand up the first pipe 161. The first valve 151 may be opened and steam from the first amount of hot water in the drum 222 may expand into first pipe 161. The steam may decrease from $P_{drum}$ towards $P_{condenser}$ by expanding against a slug of water through first pipe 161. The viscosity of the water may hold the slug of water together as it is pushed by the steam. The pressure ($P_H$) of the steam and the amount of hot water in the drum 222 may be sufficient to push a first slug of water from the SIB 170 of the first pipe 161 into the condenser 130. A second slug of water may enter the SIB 170 (e.g., after the steam pushes the first slug into the condenser 130 or before the steam pushes the first slug into the condenser 130 as long as the first slug has the kinetic energy to enter the condenser). The second slug of water may be pushed by a second amount of steam and the second slug of water may push the previous amount of steam into the condenser 130.

The condenser 130 may mix the slug of water with the steam to generate a mixture (e.g., a saturated mixture). The steam, slug of water, and air pump 226 may maintain the condenser 130 at a constant pressure ($P_{condenser}$) (P and temperature ($T_{condenser}$). $T_{condenser}$ may be higher than $T_C$ and lower than $T_H$.

The fourth valve 154 may remain closed while the air pump 226 initially sets the pressure of the condenser 130 to $P_{condenser}$. The fourth valve 154 may also remain closed to store energy in the condenser 130. The fourth valve 154 may be opened to allow the liquid water from the condenser 130 to flow (e.g., fall) through the third pipe 163 to the turbine 140 to spin the turbine to generate electrical power. The liquid water may exit the turbine 140 to the cold reservoir 216. The liquid water from the turbine 140 may be at $T_{condenser}$ that is higher than $T_C$ of the cold reservoir 216. The liquid water at $T_{condenser}$ may mix with the water in the cold reservoir 216 (to meet equilibrium) and the cold reservoir 216 may maintain $T_C$ via convection and evaporation.

The drum 222 may be a throttling drum. The drum 222 may throttle the water to a pressure ($P_{drum}$) that is lower than $P_{H,sat}$. In some implementations, the drum is elevated at a height (H1) similar to the height of the SIB. The height H1 may be such that the steam outlet of the drum 222 may be as close as possible to the slug bottom face (e.g., H1 may be substantially similar to or the same as the height H6 of SIB 170). The drum 222 may be connected to the heat source (e.g., hot reservoir 212) by a fourth pipe 164 and a third valve 153. The third valve 153 may be a throttling valve.

The drum 222 may be connected to a disposal sink 214 that is vertically below the drum 222 by a fifth pipe 165 and a fifth valve 155. The disposal sink 214 may be located below the drum 222. The disposal sink 214 may be situated far enough below the drum 222 (vertical height H2) such that water easily drains out of the drum 222. The fifth valve 155 may be controlled to remove liquid water from the drum 222 (e.g., at the end of the cycle).

In some embodiments, the water may be drained out of the drum 222 when the drum 222 is at the pressure of the condenser 130 ($P_{condenser}$) and/or the temperature of the condenser ($T_{condenser}$). For example, the liquid in the drum 222 may be initially at 100° C. and the liquid may be drained once the liquid is proximate to 30° C. In some embodiments, the liquid may be drained out of the drum 222 at the end of each cycle.

In some embodiments, the liquid may be drained out of the drum when the liquid is at a pressure and/or temperature that are lower than $T_H$ and $P_H$, but higher than $T_{condenser}$ and $P_{condenser}$. For example, the liquid in the drum 222 may be initially at 100° C. and the liquid may be drained once the liquid is proximate to 60° C. when $T_{condenser}$ is at 30° C.

In some embodiments, there is a constant flow of hot water from the hot reservoir 212 into the drum 222 by flowing the hot water at a constant rate into the drum 222 and flowing steam and remaining hot water out of the drum 222. The drum 222 may be a drum or a throttling valve to adjust the pressure (e.g., reduce the pressure) of the steam to push the slug of water up the first pipe 161 into the condenser 130. The first valve 151 may close while the slug of water is being siphoned into the SIB 170 from the cold reservoir 216. The control box 228 may control first valve 151, second valve 152, third valve 153, and fifth valve 155 to provide the amount of water in each slug and the pressure of steam to be able to push each slug into the condenser 130.

The drum 222 may be connected to the SIB 170 by first pipe 161 and a first valve 151 in the first pipe 161. The first valve 151 may be located at the top of the drum 222.

The drum 222 may be fueled by injections of hot water from hot reservoir 212 (e.g., a reservoir of hot water). The drum 222 may be configured to maintain $P_H$ and to throttle the water from $P_H$ to a pressure ($P_{drum}$) that is lower than $P_{H,sat}$. By throttling the water to $P_{drum}$, some of the liquid water changes to steam to expand up the pipe. The condenser 130 may be configured to maintain $P_{condenser}$ corresponding to a saturation pressure of the cold water from the slug mixed with condensate. $P_{condenser}$ may be lower than $P_{drum}$. The steam from the drum, when allowed by the first valve 151, may expand against the $P_{condenser}$ at the condenser 130, pushing the slug up the first pipe 161 and into the condenser 130. The water from the slug may be mixed with the steam coming into the condenser 130, cooling and condensing the steam and maintaining $P_{condenser}$ of the condenser 130.

The SIB 170 may be a U-shaped bend in the first pipe 161 adjacent to and just above the drum 222. Cold water may be injected to the SIB 170 from a cold water source (e.g., the heat sink, the cold reservoir 216). The timing and amount of this injection may be controlled by second valve 152. Timing and duration of the second valve 152 may be controlled to inject the first amount of water into the SIB 170 without a pump. In some embodiments, at the time of the injection, the SIB 170 may be at a lower pressure ($P_{condenser}$) than the heat sink (e.g., $P_{atm}$ of cold reservoir 216) and the water may be sucked into the SIB 170 when the valve is opened without the need for a pump. In some embodiments (the first cycle), air pump 226 provides the pressure difference (maintains $P_{condenser}$ below $P_{atm}$) to siphon the cold water from the cold reservoir 216. The height (H6) of the SIB may be slightly less than the pressure differential in head that exists between the atmosphere and the condenser 130. The height H6 may be the maximum height possible so that a difference between $P_{condenser}$ and $P_{atm}$ of the cold water source 120 (e.g., cold reservoir 216) is sufficient to propel the cold water into the SIB 170 without mechanical assistance (e.g., such that water is quickly and easily sucked into the SIB 170 at the time of injection when the pressure in the SIB 170 is equal to that of the condenser 130).

The condenser 130 may be a jet condenser. The condenser may include a top compartment and a bottom compartment. Liquid water from the slug may come into direct contact with the steam coming behind it. The cold water from the slug may enter (e.g., fall) into a top compartment in the condenser where the condenser may spray a mist of water from the slug of water into the bottom compartment. The steam behind the slug may be routed via steam inlet 134 to the bottom compartment in the condenser 130 by a second pipe 162, where the steam rises to meet the liquid water mist and condenses. The bottom of the condenser may be coupled to a third pipe 163 that extends to a turbine through which liquid water (e.g., the slug water and condensate) flow (e.g., fall) to enter the turbine 140. The liquid water may spin the turbine 140 to generate electric power. The height (H5) of the condenser 130 may be great enough so that the pressure of a column of water of height H5 is greater than the difference in pressure between the cold reservoir 216 and the condenser 130. This difference in pressure between the condenser and a pressure in head having the value H5 may determine the maximum possible pressure at which the turbine may be operated.

The turbine 140 may be located below the condenser 130 and may be connected to the condenser by a vertical third pipe 163. The third pipe 163 may be termed a water tower 180 which as a height of H5. Condensate and cooling water run down the water tower 180 (e.g., third pipe 163) and enter the turbine 140 at an absolute pressure in head equal to the height of the water tower 180. The falling water may spin the turbine 140 to generate electrical power.

The system 200 may include a control box 228. The control box 228 may regulate the timing of valves of the system and control the amount of water injected into the drum 222 and into the SIB 170. The control box 228 may determine the amount of water injected based on variables including temperatures of the hot reservoir 212 and the cold reservoir 216 and power generation needs of the operators.

The control box 228 may include a processing device to execute operations. The processing device may include one or more of a processor, a microprocessor, a controller, a microcontroller, an application specific integrated circuit (ASIC), a field programmable gate array (FPGA), a digital signal processor (DSP), network processor or the like. The operations may include one or more of blocks 502-514 of FIG. 5. The processing device of the control box 228 may execute a control algorithm to determine the first amount of cold water to be injected into the SIB 170 and the first amount of hot water to be injected into the drum 222, respectively, based on variables comprising at least one of a temperature of the steam source, a temperature of the cold water source, a temperature of atmosphere, and a specified power generation requirement.

As shown in FIG. 2, the turbine 140, the steam source 110, and the SIB 170 may be above ground level. The condenser 130 is located at a height above the turbine 140, the steam source 110, and the SIB 170. The liquid water may flow (e.g., fall) from the condenser 130 down the height through a pipe (e.g., third pipe 163) and enter the turbine 140 to spin the turbine 140 to generate electrical power.

Figure 3:
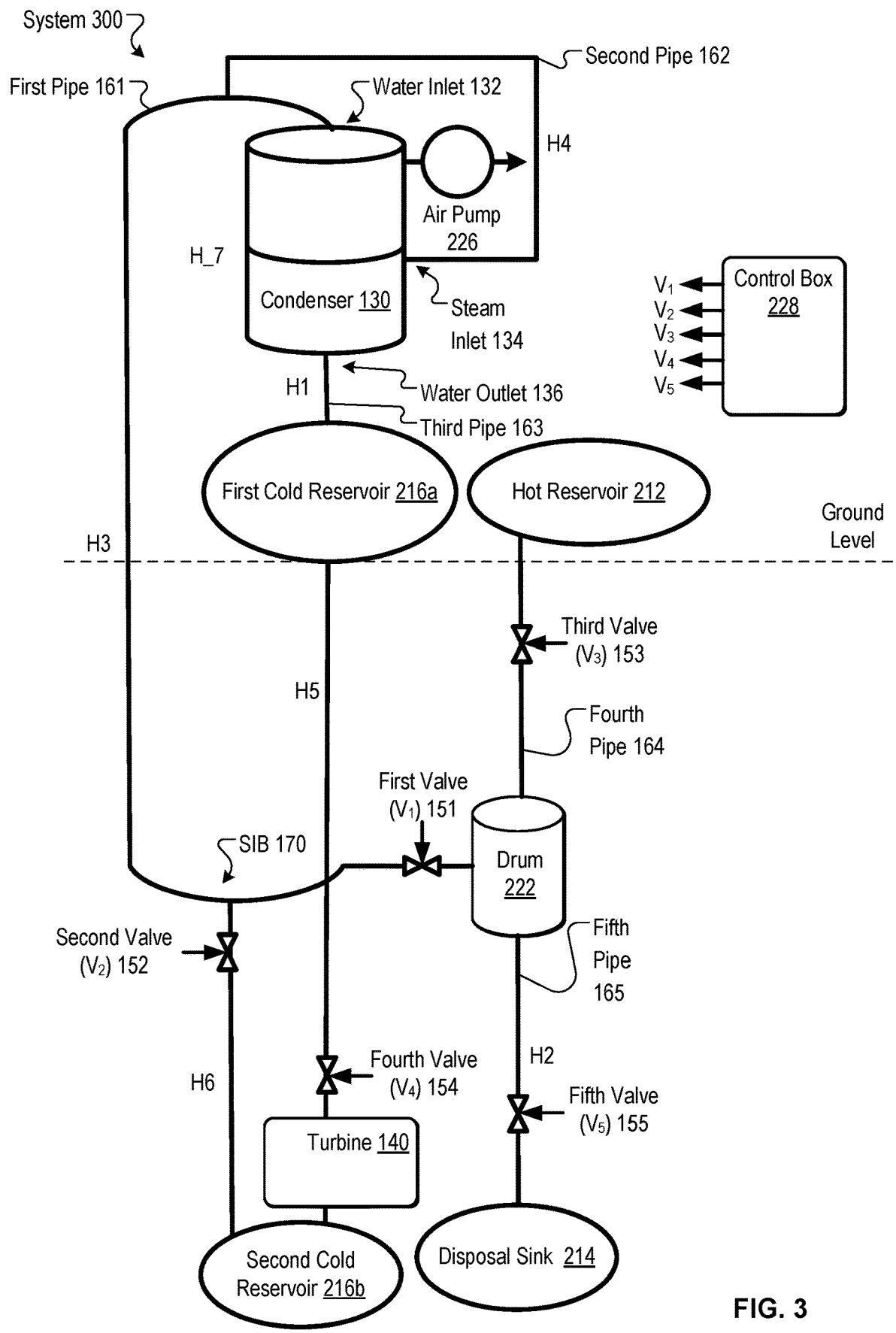
FIG. 3 is a schematic diagram illustrating a system to generate electrical power, according another embodiment.

FIG. 3 is a schematic diagram illustrating a system 300 to generate electrical power, according another embodiment. Elements in FIG. 2 that have a similar reference number as elements in FIG. 2 and/or FIG. 1 may include similar features and similar functionality. System 300 may be a heat engine that transforms a low-level temperature differential between a heat source and a heat sink into useful electrical power. System 300 may be a hybrid heat engine. A hybrid heat engine may produce electric power from a lower temperature heat source, For example, a hybrid heat engine may combine characteristics of a steam engine and a power plant (e.g., hydropower plant) to economically produce electric power from a low temperature heat source.

As shown in FIG. 3, the turbine 140 and the steam source 110 are below ground level. The condenser 130 is located above ground level. The condenser 130 may be located at a height above the turbine 140. The liquid water may flow from the condenser 130 down the height through a pipe and enter the turbine to spin the turbine 140 to generate electrical power.

As shown in FIG. 3, the hot reservoir 212 is located above the drum 222. The hot water from the hot reservoir 212 may flow to and pressurize the hot water in the drum 222 without the use of a pump (e.g., pump 224). As shown in FIG. 3, since the turbine 140 is located below ground level, the condenser 130 may not be located on a water tower 180 or the water tower 180 may be shorter than the water towers 180 of FIGS. 1-2.

The control box 228 opens third valve 153 to insert a first amount of hot water in the drum 222 from the hot reservoir 212 via fourth pipe 164. The first amount of hot water in the drum is at $P_H$ which is greater than $P_{H,sat}$ of the hot water in the hot reservoir 212. The drum 222 may throttle the water to a pressure ($P_{drum}$) that is at $P_{H,sat}$ or a lower pressure. The SIB 170 is at $P_{condenser}$ that is less than $P_C$ of the second cold reservoir 216b. The second cold reservoir 216b may be a tank under the turbine 140. The second cold reservoir 216b may be smaller than the first cold reservoir 216a.

In some embodiments, the control box 228 opens second valve 152 to siphon a first amount of cold water from the second cold reservoir 216b located below turbine 140. In some embodiments, the control box 228 opens second valve 152 to siphon a first amount of cold water from the turbine 140. The first amount of cold water may be siphoned because of the difference in pressure between $P_{condenser}$ and $P_C$. The control box 228 opens first valve 151 to allow the first amount of hot water at $P_{drum}$ in the drum 222 which is greater than $P_{condenser}$ to expand and to push the slug of water (the first amount of cold water in the SIB 170) up the first pipe 161 and to the condenser 130. The slug of water enters the condenser 130 via water inlet 132, the steam enters the condenser via steam inlet 134, and the slug and steam mix (e.g., the steam condenses). Liquid water from the condenser 130 flows through third pipe to one or more of first cold reservoir 216a or to the turbine 140. The liquid water from the condenser 130 may be stored in the first cold reservoir 216a to store energy for later use. In some embodiments, the fourth valve 154 is disposed between the turbine and the first cold reservoir 216a, proximate first cold reservoir 216a. In some embodiments, a sixth valve 156 is disposed between the condenser 130 and the first cold reservoir 216a.

The control box 228 may open the fifth valve 155 for the liquid in the drum 222 to flow to the disposal sink 214. In some embodiments, the liquid in the disposal sink is pumped to ground level to be disposed. In some embodiments, the disposal sink is below the water table and the liquid in the disposal sink 214 percolates into the ground.

In some embodiments, the components of system 300 that are below ground level may be in a well (e.g., a shaft that extends into the ground). For example, the components below ground level may be in an oil well (e.g., a used oil well).

In one embodiment, the heat engine in system 200 of FIG. 2 and/or the heat engine in system 300 of FIG. 3 are part of a first heat engine cycle including states 1a-5a. From state 1a to state 2a, hot water from the hot reservoir 212 may be pressurized to a pressure ($P_H$) greater than the saturation pressure ($P_{H,sat}$) of hot water. The pressurized hot water may be injected into the drum 222 and sealed therein. The drum 222 may throttle the water to a pressure ($P_{drum}$) that is lower than $P_{H,sat}$.

From state 2a to state 3a, the first valve 151 between the drum 222 and the first pipe 161 opens. Hot steam leaves the drum under pressure ($P_{drum}$) and pushes against the slug in the SIB 170, pushing the slug up the first pipe 161 into the condenser 130. As the steam from the drum expands, the saturated mixture cools until it is the temperature ($T_{condenser}$) of the condenser 130 as the last of the slug spills into the condenser 130. The fifth valve 155 between the drum 222 and the disposal sink 214 opens and the now cold liquid water (e.g., colder than $T_H$) in the drum 222 is expelled to the disposal sink.

From state 3a to state 4a, the steam, now at the saturation temperature and pressure of the condenser 130, is pushed into the condenser 130 by a succeeding slug. In the condenser 130, the steam mixes with the atomized liquid water from the slug the steam had pushed and the steam is condensed to liquid water. Non-condensable gases are pumped out of the condenser by an electric pump (e.g., air pump 226).

From state 4a to state 5a, the slug water and condensate fall down the water tower 180 (third pipe 163) and run through a turbine 140, generating electric power. The liquid water is then expelled from the turbine 140 to the cold reservoir 216.

From state 5a to state 1a, the slug water and condensate are cooled to the temperature of the cold reservoir by convection with the surroundings and by evaporation. The cold water is then sucked up into the SIB 170 and the cycle is complete.

In another embodiment, the heat engine in system 200 of FIG. 2 and/or the heat engine in system 300 of FIG. 3 are part of a second heat engine cycle including states 1b-5b. The second heat engine cycle may maintain steady state (e.g., constant pressure and constant temperature) in the drum 222 which may simplify the system. The second heat engine cycle may have a greater energy output than the first heat engine cycle over time, but may be less efficient than the first heat engine cycle.

From state 1b to state 2b, hot water from the hot reservoir 212 is pressurized to a pressure ($P_H$) greater than the saturation pressure ($P_{H,sat}$) of the hot water and is injected into the drum 222 where the hot water is throttled to a pressure ($P_{drum}$) less than the saturation pressure of the hot water in the hot reservoir 212. By throttling to $P_{drum}$, some of the liquid water changes to steam and then can expand up the pipe, pushing the slug.

From state 2b to state 3b, hot steam leaves the drum 222 at constant pressure and pushes against the slug in the SIB 170, pushing the slug up the pipe 161 into the condenser 130. A constant pressure and temperature is maintained in the drum 222 by regulating the flow of hot water into the drum 222 and the flow of liquid water out of the drum 222 to the disposal sink 214. Once the slug has sufficient kinetic energy to make it to the condenser 130 without assistance from the force of the hot steam beneath it, a new slug is sucked into the SIB 170.

From state 3b to state 4b, in the condenser 130, the steam mixes with the atomized liquid water from the slug that the steam had pushed and the steam is condensed to liquid water. Non-condensable gases are pumped out of the condenser by an electric pump (air pump 226).

From state 4b to state 5b, liquid water (e.g., the slug of water and condensate) fall down the water tower 180 and run through a turbine 140, generating electric power. The liquid water is then expelled to the cold reservoir 216.

From state 5b to state 1b, the slug water and condensate are cooled to the temperature of the cold reservoir 216 by convection with the surroundings and by evaporation. The cold water is then sucked up into the SIB 170 and the cycle is complete.

In some embodiments, the system 200 of FIG. 2 and/or the system 300 of FIG. 3 has an alternative heat engine design. In the alternative heat engine design, H1 may be such that pressure head of H1 is equal to atmospheric pressure ($P_{atm}$) minus the pressure in the condenser 130

($P_{condenser}$)=($h_{H1}$=$P_{atm}$−$P_{condenser}$). In the alternative engine design, H2 may be such that the pressure head of H2 is equal to atmospheric pressure ($P_{atm}$) minus the pressure in the drum 222 ($P_H$) ($h_{H2}$=$P_{atm}$−$P_{drum}$). In the alternative heat engine design, H3 times acceleration of gravity times mass flow rate of the slug up the tower is the work rate done by the system. In the alternative heat engine design, H5 times acceleration of gravity times mass flow rate of water from the condenser 130 to the turbine 140 is the output work rate of the system. In the alternative heat engine design, H6 may be such that pressure head of H6 is less than atmospheric pressure ($P_{atm}$) minus the pressure in the first pipe 161 at the slug intake ($P_{pipe}$) ($h_{H6}$<$P_{atm}$−$P_{pipe}$). How much less depends on the pressure differential needed to upload the slug. The pressure differential may be minimized to maximize output work. In the alternative heat engine design, H7 (height of condenser 130) may be sufficient height so that the cold water from the slug runs through the condenser 130. The condenser 130 height H7 may be minimized to maximize output work.

Figure 4:
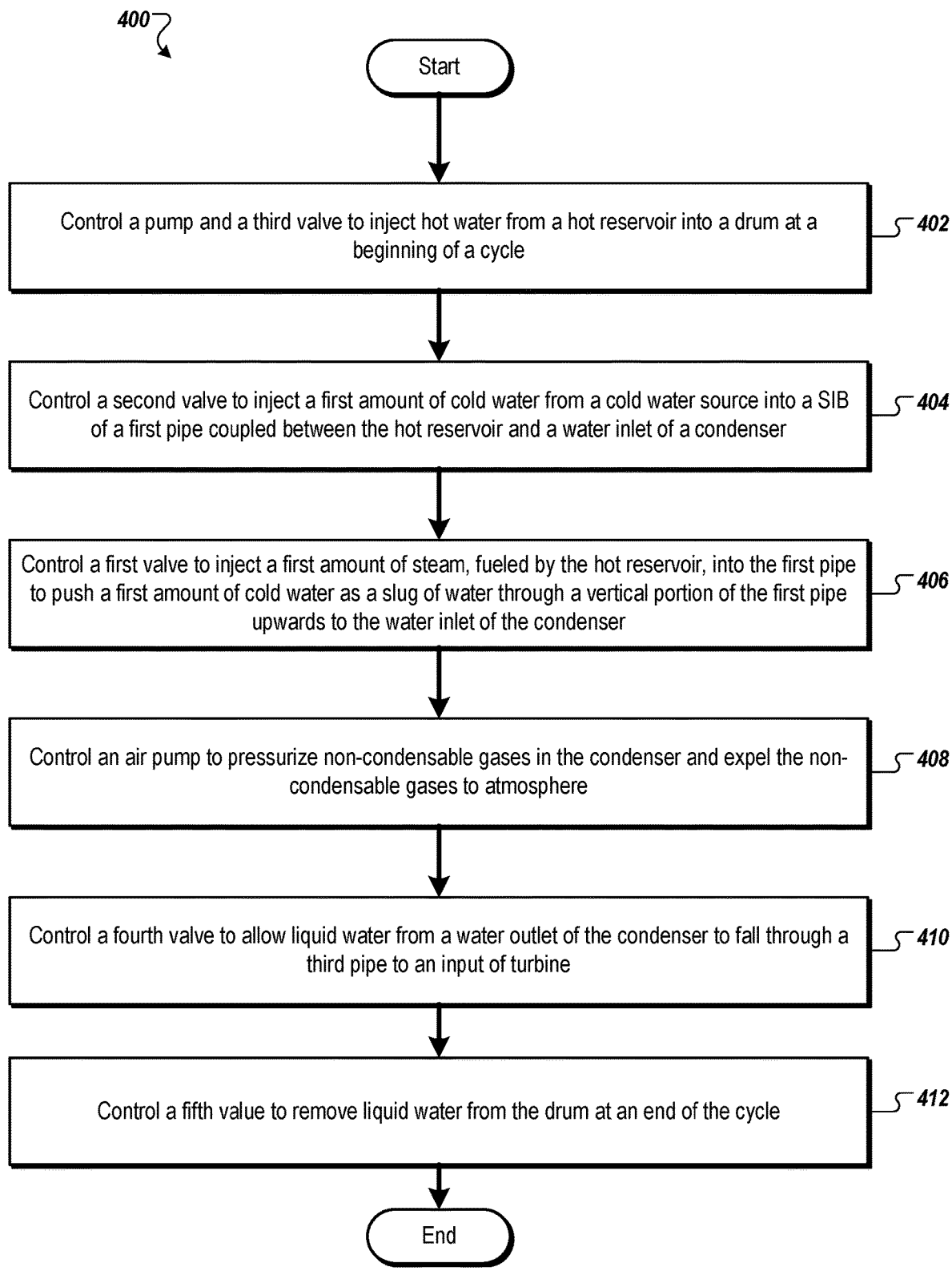
FIG. 4 is a flow diagram of one embodiment of a method of generating electrical power, in accordance with embodiments of the present disclosure.

FIG. 4 is a flow diagram of one embodiment of a method 400 of generating electrical power, in accordance with embodiments of the present disclosure. The method 400 may be performed by processing logic that includes hardware (e.g., circuitry, dedicated logic, programmable logic, microcode, etc.), software (e.g., instructions run on a processor to perform hardware simulation), or a combination thereof. In one embodiment, the method 400 may be performed by system 100 of FIG. 1. In one embodiment, the method 400 may be performed by system 200 or control box 228 of FIG. 2. In one embodiment, the method 400 may be performed by system 300 or control box 228 of FIG. 3. In one embodiment, the method 400 may be performed by a processing device of a control box 228 of a heat engine. Alternatively, the method 400 can be performed by other components as described herein.

Referring to FIG. 4, at block 402, the control box 228 implementing the method may control the pump 224 and the third valve 153 to inject hot water into the throttling drum 222 at a beginning of a cycle.

At block 404, the control box 228 may control a second valve 152 to inject a first amount of cold water from a cold water source 120 into a SIB 170 of a first pipe 161 coupled between a steam source 110 and a water inlet 132 of a condenser 130. In some embodiments, the control box 228 may control the air pump 226 in conjunction with the second valve 152 to inject the first amount of cold water from the cold water source 120 into the SIB 170.

At block 406, the control box 228 may control a first valve 151 to inject a first amount of steam, fueled by a hot water source (e.g., of a hot reservoir 212), from the drum 222 into the first pipe 161 to push the first amount of cold water as a slug of water through a vertical portion of the first pipe 161 upwards to the water inlet 132 of the condenser 130. The first amount of steam may enter a steam inlet 134 of the condenser 130.

At block 408, the control box may control the air pump 226 to remove non-condensable gases from the condenser 130.

At block 410, the control box may control a fourth valve 154 to allow liquid water from a water outlet 136 of the condenser 130 to flow (e.g., fall) through a third pipe 163 to an input of turbine 140 (e.g., a hydro-electric turbine). The liquid water may spin the turbine 140 to generate electrical power.

At block 412, the control box may control the fifth valve 155 to remove water (e.g., liquid water) from the drum 222 at an end of the cycle.

Figure 5A:
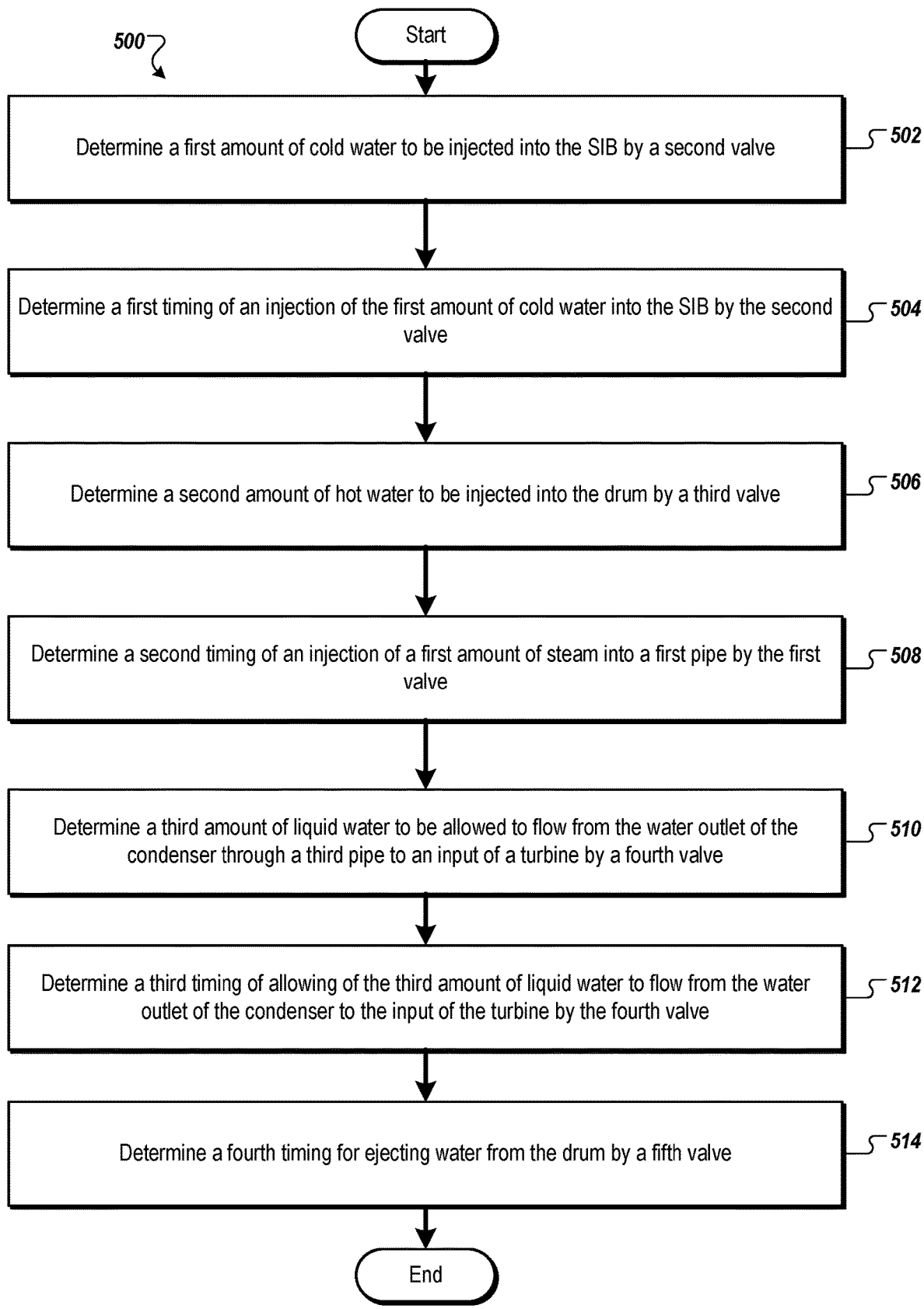
FIG. 5A is a flow diagram of one embodiment of a method of computing values to control a mechanical system to generate electrical power, in accordance with embodiments of the present disclosure.

FIG. 5A is a flow diagram of one embodiment of a method 500 of computing values to control a mechanical system to generate electrical power, in accordance with embodiments of the present disclosure. The method 500 may be performed by processing logic that includes hardware (e.g., circuitry, dedicated logic, programmable logic, microcode, etc.), software (e.g., instructions run on a processor to perform hardware simulation), or a combination thereof. In one embodiment, the method 500 may be performed by system 100 of FIG. 1. In one embodiment, the method 500 may be performed by system 200 or control box 228 of FIG. 2. In one embodiment, the method 500 may be performed by system 300 or control box 228 of FIG. 3. In one embodiment, the method 500 may be performed by a processing device of a control box 228 of a heat engine. Alternatively, the method 500 can be performed by other components as described herein.

Referring to FIG. 5A, at block 502, the control box 228 implementing the method 550 may determine the first amount of cold water to be injected into the SIB 170 by the second valve 152. The first amount of cold water may be based on variables comprising at least one of a temperature of the steam source 110, a temperature of the cold water source 120, a temperature of atmosphere, and a specified power generation requirement.

At block 504, the control box 228 may determine a first timing of an injection of the first amount of cold water into the SIB 170 by the second valve 152. The timing may be after the condenser 130 is at a pressure ($P_{condenser}$) that is less than the pressure ($P_{atm}$) of the cold reservoir 216. The control box 228 may control the air pump 226 to set the pressure of the condenser 130 to $P_{condenser}$.

At block 506, the control box 228 may determine a second amount of hot water to be injected into the drum 222 by the third valve 153. The first amount of hot water may be based on variables comprising at least one of a temperature of the steam source 110, a temperature of the cold water source 120, a temperature of atmosphere, and a specified power generation requirement.

At block 508, the control box 228 may determine a second timing of an injection of a first amount of steam into the first pipe 161 by the first valve 151.

At block 510, the control box 228 may determine the third amount of liquid water to be allowed to flow from the water outlet 136 of the condenser 130 through the third pipe 163 to an input of a turbine 140 by the fourth valve 154.

At block 512, the control box 228 may determine a third timing of allowing of the third amount of liquid water to flow from the water outlet 136 of the condenser 130 to the input of the turbine 140 by the fourth valve 154.

At block 514, the control box 228 may determine a fourth timing for ejecting water from the drum 222 by the fifth valve 155.

Figure 5B:
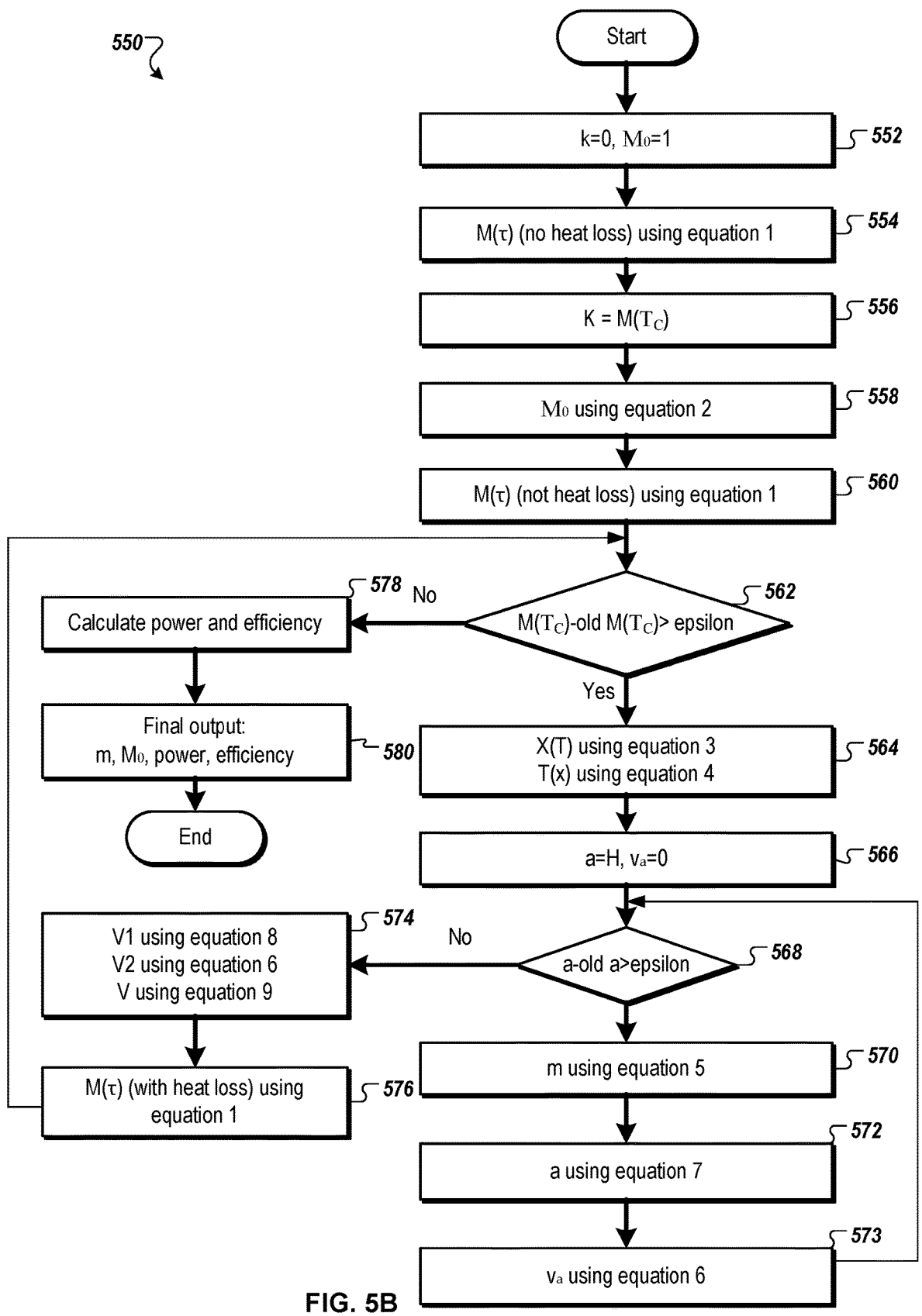
FIG. 5B is a flow diagram of one embodiment of a method of computing values to control a mechanical system to generate electrical power, in accordance with embodiments of the present disclosure.

FIG. 5B is a flow diagram of one embodiment of a method 550 of computing values to control a mechanical system to generate electrical power, in accordance with embodiments of the present disclosure. The method 550 may be performed by processing logic that includes hardware (e.g., circuitry, dedicated logic, programmable logic, microcode, etc.), software (e.g., instructions run on a processor to perform hardware simulation), or a combination thereof. In one embodiment, the method 550 may be performed by system 100 of FIG. 1. In one embodiment, the method 550 may be performed by system 200 or control box 228 of FIG. 2. In one embodiment, the method 550 may be performed by system 300 or control box 228 of FIG. 3. In one embodiment, the method 550 may be performed by a processing device of a control box 228 of a heat engine. Alternatively, the method 550 can be performed by other components as described herein.

Method 550 may enable the control box 228 to optimize the variables for efficiency, power, and cost. The control box 228 implementing the method 550 may determine, in real time, the optimal amount (e.g., mass) of cold water to be injected into the SIB 170 per cycle and the optimal amount (e.g., mass) of hot water to be injected into the drum 222 per cycle. The method 550 may use successive substitution approach to simultaneously solve equations (1) through (10). Equations (1)-(10) and the corresponding variables are shown below.

Referring to FIG. 5B, at block 552, the control box 228 implementing the method 550 may set k to zero and $M_0$ to one ($k=0$ and $M_0=1$).

At block 554, the control box 228 may calculate (e.g., using an initial value problem (IVP) solver) $M(\tau)$ using equation (1) with no heat loss. Equation (1):

$$M'(\tau)=(E(\tau,M))/(F(\tau,M)), T_C \leq \tau \leq T_H, M(T_H)=M_0$$

$$E(\tau,M)=M*\delta'(\tau)-M_0*u_g'(\tau)+[(k*X(\tau,M)*(\tau-T_{atm}))/(A*v(X(\tau,M)))+P(\tau)]*R(\tau)*(M_0-M)$$

$$F(\tau,M)=-\delta(\tau)-[(k*X(\tau,M)*(\tau-T_{atm}))/(A*v(X(\tau,M)))+P(\tau)]*S(\tau)$$

$$\delta(\tau)=u_g(\tau)-u_f(\tau)$$

$$R(\tau)=(\rho_{st}'(\tau))/(\rho_{st}^2(\tau))-(\rho_w'(\tau))/(\rho_w^2(\tau))$$

$$S(\tau)=(\rho_w(\tau)-\rho_{st}(\tau))/(\rho_{st}(\tau)*\rho_w(\tau)) \quad (1)$$

At block 556, the control box 228 may calculate K using the following equation: $K=M(T_C)$.

At block 558, the control box 228 may calculate $M_0$ using equation (2). Equation (2) is an initial guess of $M_0$ (the mass of water injected in the drum 222):

$$M_0=\rho_{st}(T_C)*v_{max}/(1-K) \quad (2)$$

At block 560, the control box 228 may set $k=0$ and use the initial guess of $M_0$ from block 558, to again compute $M(\tau)$ using equation (1) (e.g., using an IVP solver) with no heat loss.

At block 562, the control box 228 may determine whether $M(T_C)$ minus the old $M(T_C)$ is greater than epsilon (a small number that represents the tolerance for error in the results of the method 550; as long as the estimated error is greater than a user-defined epsilon, the method will be iterated to provide better results) using the following equation:

$$M(T_C)-\text{old } M(T_C) > \varepsilon$$

In response to $M(T_C)$ minus old $M(T_C)$ being greater than epsilon, flow continues to block 564. In response to $M(T_C)$ minus old $M(T_C)$ not being greater than epsilon, flow continues to block 578.

At block 564, the control box 228 may calculate $X(\tau, M)$ using equation (3) and calculate $T(x)$ using equation (4). Equation (3) is used to determine the position of the bottom edge of the slug up the first pipe 161 (at temperature $\tau$ and mass M):

$$X(\tau,M)=(M_0-M)*S(\tau)/A \quad (3)$$

The variables $M_0$ and M may be recalibrated to make up for the volume in the drum 222 that will be occupied by steam as the liquid water changes to steam. This may be calculated using a bisection method to find the correct value of $M_0$ such that $X(T_C)=H$ and recalculating M with no heat loss (using the IVP solver on each iteration).

The variable $X(T)$ may be redefined with the revised $M(T)$ function using equation (3). Equation (4) may provide the temperature of the saturated mixture below the slug when the slug is at position "x." Equation (4) is a temperature at position x:

$$T(x)=\text{inverse of } X(\tau) \quad (4)$$

At block 566, the control box 228 may set $a=H$ and $v_a=0$.

At block 568, the control box 228 may determine whether a minus old a is greater than epsilon with the following equation: $a-\text{old } a > \varepsilon$.

In response to a minus old a being greater than epsilon, flow continues to block 570. In response to a minus old a not being greater than epsilon, flow continues to block 574.

At block 570, the control box 228 may calculate $m(a,v_a)$ using equation 5. Equation (5) is used to determine the optimum mass of the slug such that it will have velocity $v_x$ at position x:

$$m(x,v_x)=(2*c*e^{-2cx})/(c*v_x^2+g*(1-e^{-2cx}))*\int_0^x e^{2cz}*F(T(z))dz \quad (5)$$

At block 572, the control box 228 may calculate "a" using equation (7). Equation (7) is used to determine the position "a" of the bottom edge of the slug in the first pipe 161 in meters when the top edge reaches the top of the first pipe 161. Equation (7) is:

$$a=a(H,m,D,t_s)=H-(4*m)/(\pi*D^2*\rho_w(t_s)) \quad (7)$$

At block 573, the control box 228 may calculate $v_a$ using equation (6).

After block 573, flow may continue to 568. Blocks 568-572 may be a while loop to converge on optimum "m" and "a."

At block 574, the control box 228 may calculate $v_1(x)$ using equation (8), calculate $v_2(x)$ using equation (6), and calculate $v(x)$ using equation (9).

Equation (6) is used to determine the velocity "$v_2(x)$" of the slug at position x from a to H, and is the minimum velocity necessary for the slug to have at position x when the top edge of the slug reaches the top of the first pipe 161, in order to completely clear the top of the first pipe 161. Equation (6):

$$v_2(x)\text{sqrt}((g/c)*[e^{2c(H-x)}-1]-((2*e^{-2cx})/(\rho*A))*\int_H^x (e^{2cz}*F(T(z)))/(H-z)dz) \quad (6)$$

Equation (8) may give the velocity of the slug from 0 to "a":

$$v_1(x)=\text{sqrt}(((2*e^{-2cx})/m)*\int_0^x (e^{2cz}*F(\tau(z)))dz-(g/c)(1-e^{-2cx})) \quad (8)$$

Equation (9) is used to determine the velocity of the slug up the pipe at position x. Equation (9) may be a concatenation of $v_1(x)$ and $v_2(x)$ and may provide the velocity of the slug from 0 to H:

$$v(x)=v_1(x), \text{ for } 0 \leq x \leq a; v(x)=v_2(x), \text{ for } a \leq x \leq H \quad (9)$$

At block 576, $M(\tau)$ with heat loss may be recalculated (using an IVP solver) using equation (1). At block 576, $M(\tau)$ with heat loss may be recalculated resetting "k" to its true value.

After block 576, flow may continue to block 562. At block 562, $M_0$ and M may be recalibrated to make up for the volume in the drum that will be occupied by steam as the liquid water changes to steam, using a bisection method to find the correct value of $M_0$ such that $X(T_C)=H$. A while loop may be used to repeat recalculating $M(\tau)$ using equation 1 and recalibrating $M0$ and $M$ using the bisection method until $X(T_C)=H$ and $X(T_H)=0$ (with a threshold tolerance).

A while loop may be used to repeat blocks 564-562 until $M(T_C)$ converges. Values for "a," "m(x,v$_x$)," "v$_1$(x)," "v$_2$(x)," and "v(x)" may be recalculated using equations (7), (5), (8), (6), (9), and using the new $M$ and $M_0$.

At block 578, the control box 228 may calculate power and efficiency of the system. In some embodiments, the time for the slug to spill over the top of the first pipe 161 may be calculated. In some embodiments, the theoretical efficiency of the system may be calculated.

At block 580, the control box 228 may generate a final output of m, $M_0$, power, and efficiency. To calculate power, the time for each cycle is calculated, work Output per cycle is calculated, and then power is calculated. Time for each cycle may be calculated by integrating $1/v(x)$ from zero to H. Work output per cycle may be calculated as the mass of the slug times g times the height of the water tower. Power may be calculated as work over time.

Efficiency may be calculated as the work output divided by the energy input. Energy input may be calculated as the internal energy of the liquid water at $T_H$ when the liquid water is put into the drum 222 minus the internal energy of the water at the end of the cycle at $T_C$.

The control box 228 may compute values for m and $M_0$. The values for m and $M_0$ may be used to find intermediate values that optimize power and efficiency according to the needs of an operator of the system.

In some embodiments, the control box 228 may perform operations a)-t) to calculate optimum slug mass and velocity of the slug if $M_0$ is increased beyond the ideal amount.

At operation a), the control box 228 may determine the value for $M_0$ has been increased beyond the ideal value by multiplying $M_0$ by a factor greater than 1.

At operation b), the control box 228 may set the value of "k" to 0 (k=0) and $M(\tau)$ may be recalculated with the new $M_0$ from operation a).

At operation c), the control box 228 may recalculate $X(T)$ and $T(x)$.

At operation d), the control box 228 may set the value for "a" to ideal "a" for optimum $M_0$ found in block 562 (e.g., recalculating values for "a," "m(x,v$_x$)," "v$_1$(x)," "v$_2$(x)," and "v(x)" using equations (7), (5), (8), (6), (9), and using the new values for $M$ and $M_0$).

At operation e), the control box 228 may set the value for "a" to a=H−((H−a)*factor) where factor is the factor by which $M_0$ is increased from the ideal.

At operation f), the control box 228 may identify the points $s_0$ in the interval [a,H], where the force of the steam and the force of gravity on the slug are of equal magnitude. A bisection method may be used to find $s_0$ such that the following equation is used:

$-g+\text{Force}(T(s_0))/(\rho^* A^*(H-s_0))=0.$

At operation g), the control box 228 may estimate the value of "$v_a$" to be equal to $v_2(a)$ from the ideal case.

At operation h), the control box 228 may calculate the square of the velocity of the slug at point $s_0$ given velocity "$v_a$" when the top edge of the slug reaches the top edge of the first pipe 161 using equation (10):

$v_{ns}(y,v_a)=v_a^2 * e^{-2c(y-a)}+(2*e^{-2cy})/(\rho^* A)*\int_a^y e^{2cz}*F(T(z))/(H-z)dz-(g/c)*[1-e^{-2c(y-a)}]$ (10)

At operation i), the control box 228 may use a bisection method to find the minimum (within a threshold tolerance) value for "$v_a$" such that "$v_{ns}(s_0,v_a)$" is greater than zero.

At operation j), the control box 228 may recalculate $m(a,v_a)$ using equation (5).

At operation k), the control box 228 may recalculate "a" using equation (7).

At operation l), the control box 228 may loop back to operations f) through k) until "a" converges.

At operation m), the control box 228 may calculate $v_1(x)$ using the following equation: $v_n(x)=\text{sqrt}(v_{ns}(y,v_a))$.

At operation n), the control box 228 may redefine $v_1(x)$ using equation (4) with the new "m" and the control box 228 may define $v(x)$ (the velocity of the slug) to be $v_1(x)$ on the interval [0,a] and $v_{ns}(x)$ on the interval [a,H].

At operation o), the control box 228 may recalculate $M(\tau)$ using the value of $v(x)$ (e.g., the velocity function selected in operation n) ($v_1(x)$ or $v_{ms}(x)$)).

At operation p), the control box 228 may recalculate $X(\tau)$ and $T(x)$.

At operation q), the control box 228 may loop back to operations f) through p) until $M(T_C)$ converges.

At operation r), the control box 228 may repeat operations i) through n) to calculate "a," "m," and "v(x)."

At operation s), the control box 228 may calculate the time for the slug to spill over the top of the first pipe 161.

At operation t), the control box 228 may determine power, efficiency, and the max theoretical efficiency of the system.

The following variables may be used in the equations disclosed herein.

The variable "A" is the cross sectional area of the pipe in meters squared (m$^2$).

The variable "a" is the position of the bottom edge of the slug on the pipe in meters (m) when the top edge reaches the top of the pipe, and is defined by a=a(H, m, D, t$_s$).

The variable "c" is the friction coefficient, defined as $c=\lambda/(2*D)$.

The variable "D" is the diameter (m) of the pipe.

The variable "d" is the thickness (m) of pipe insulation.

The variable "$F(\tau)$" is the net force in Newtons (N) pushing on the slug by the saturated steam below and above it, when $\tau$ is the temperature of the saturated mixture below the slug, and is defined by $F(\tau)=A*(P(\tau)-P(T_C))$.

The variable "g" is the acceleration of gravity in meters per second squared (m/s$^2$).

The variable "H" is the height (m) of the pipe.

The variable "K" is a constant used in determining the initial guess of $M_0$.

The variable "k" is a constant defined by $k=K_0*\pi*D/d$.

The variable "$K_0$" is the thermal conductivity constant of the pipe insulation in Watts per meter-Kelvin (W/(m*K)).

The variable "$\lambda$" is the Darcy-Weisbach friction coefficient which is dependent on velocity, but may be approximated as a constant between 0.018 and 0.007.

The variable "m" is the mass of the slug in kilograms (kg).

The variable "M" is the mass (kg) of the liquid water remaining in the drum 222 at temperature $\tau$, and is defined by $M=M(\tau)$.

The variable "m(x,v$_x$)" is the optimum mass (kg) of the slug such that the slug will have velocity "$v_x$" at position "x."

The variable "$M_0$" is the mass (kg) of water injected into the drum 222.

The initial guess of the variable "$M_0$" is the first guess at how much hot water to put in the drum 222.

The variable "$P(\tau)$" is the saturation pressure in Pascals (P) of the saturated mixture below the slug at temperature "$\tau$."

The variable "$\rho_{sf}(\tau)$" is the saturation density in kilograms per meters cubed (kg/m$^3$) of the steam at temperature "$\tau$."

The variable "$\rho_w(\tau)$" is the saturation density (kg/m³) of the liquid water at temperature "r."

The variable "$s_0$" is the point in the interval [a, H] where the force of the steam and the force of gravity on the slug are of equal magnitude.

The variable "$t_s$" is the inlet temperature of the slug in degrees Celsius (° C.).

The variable "$T_{am}$" is the temperature (° C.) of the atmosphere outside the system (e.g., system 100, 200, and/or 300).

The variable "$T_C$" is the saturation temperature (° C.) in the condenser 130.

The variable "$T_H$" is the initial temperature (° C.) of the saturated mixture in the drum 222.

The variable "T(x)" is the temperature (° C.) of the saturated mixture below the slug when the bottom edge of the slug is at position "x."

The variable "$u_f(\tau)$" is the specific internal energy in kilojoule per kilogram (kJ/kg) of the saturated liquid water at temperature "$\tau$."

The variable "$u_g(\tau)$" is the specific internal energy (kJ/kg) of the saturated water vapor at temperature "$\tau$."

The variable "$v_a$" is the velocity in meters per second (m/s) of the slug at position "a."

The variable "$v_1(x)$" is the velocity (m/s) of the slug up the first pipe 161 at position "x" from 0 to "a."

The variable "$v_2(x)$" is the velocity (m/s) of the slug at position "x" from "a" to "H," and is the minimum velocity necessary for the slug to have at position "x" when the top edge of the slug reaches the top of the first pipe 161, in order to completely clear the top of the first pipe 161.

The variable v(x) is the velocity (m/s) of the slug up the first pipe 161 at position x.

The variable "$v_{ns}(y,v_a)$" is the square of the velocity of the slug at position "y" from "a" to "H" given the velocity at point "a" is "$v_a$," in the case of when "$F(\tau)$" is greater than zero at "H."

The variable "$v_x$" is the velocity (m/s) of the slug at position "x."

The variable "$\upsilon_{max}$" is the maximum volume in meters cubed (m³) that the steam will occupy before the slug completely leaves the first pipe 161. In some embodiments, the volume of the steam in the drum is disregarded and "$\upsilon_{max}$" is the volume of the pipe and is defined by $\upsilon_{max}$=A*L, where L is the length of the pipe.

The variable "X($\tau$,M)" is the position (m) of the bottom edge of the slug up the first pipe 161, at temperature "$\tau$" and mass "M."

The variable "x" is the position (m) of the bottom edge of the slug up the first pipe 161 in meters.

Figure 6:
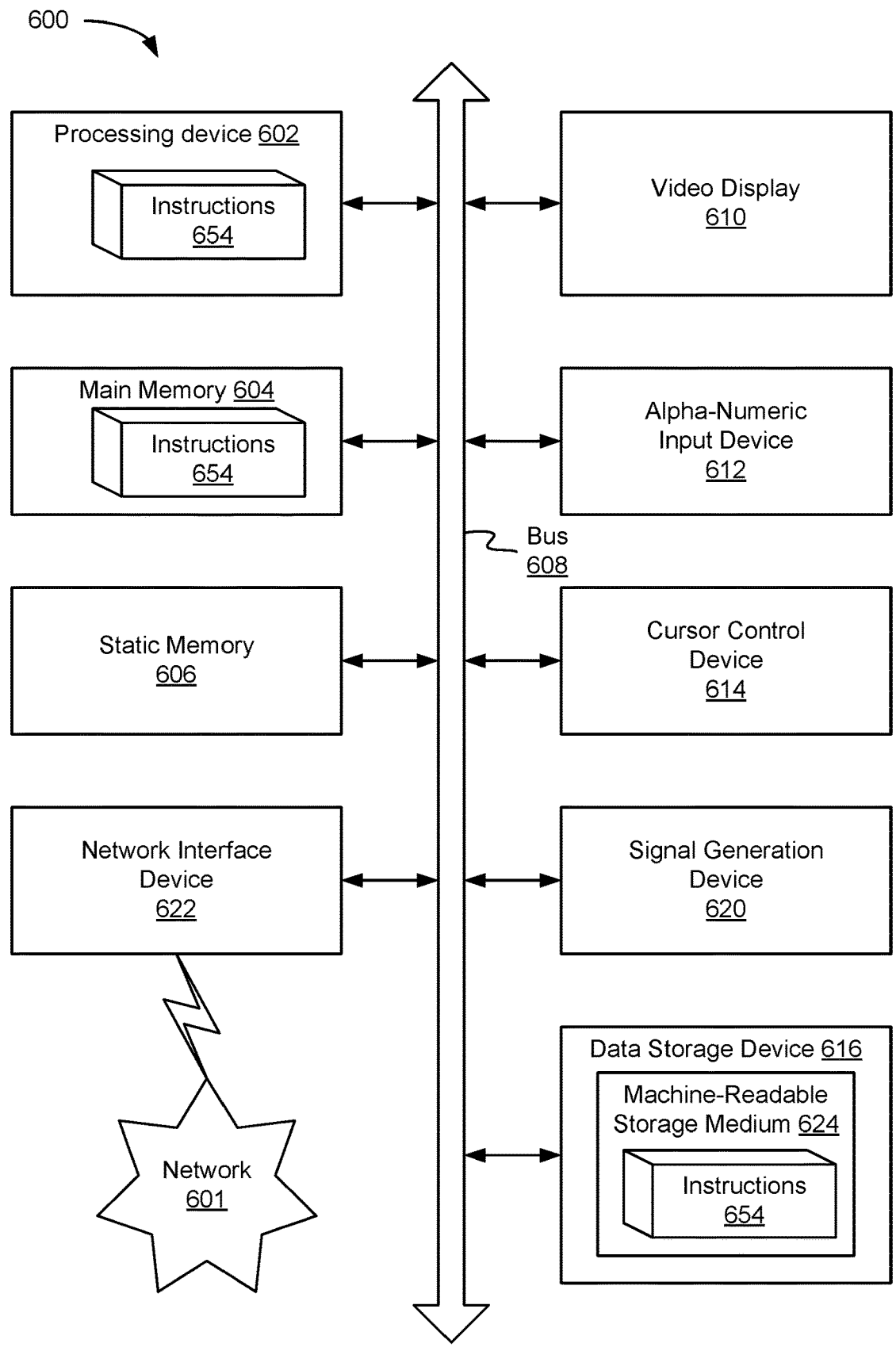
FIG. 6 illustrates a component diagram of a computer system which may implement one or more methods of generating electrical power or computing values for generating electrical power described herein.

FIG. 6 illustrates a component diagram of a computer system which may implement one or more methods of generating electrical power or computing values for generating electrical power described herein. A set of instructions for causing the computer system 600 to perform any one or more of the methods discussed herein may be executed by the computer system 600. In one embodiment, the computer system 600 may implement the functions of the control box 228 of FIGS. 2 and/or 3.

In one embodiment, the computer system 600 may be connected to other computer systems by a network 601 provided by a Local Area Network (LAN), an intranet, an extranet, the Internet or any combination thereof. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.) and a data storage device 616, which communicate with each other via a bus 608.

In one embodiment, the processing device 602 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor or the like.

The processing device 602 may be the processing device of control box 228 (see FIGS. 2-3). The processing device 602 may include one or more interfaces to connect to one or more of valves 150, sensors, pumps (e.g., air pump 226, pump 224), value control interfaces, etc.

In one embodiment, the computer system 600 may further include one or more network interface devices 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker).

In one embodiment, the data storage device 618 may include a computer-readable storage medium 624 on which is stored one or more sets of instructions 654 embodying any one or more of the methods or functions described herein. The instructions 654 may also reside, completely or at least partially, within the main memory 604 and/or within the processing device 602 during execution thereof by the computer system 600; the main memory 604 and the processing device 602 also constituting machine-readable storage media. The computer-readable storage medium 624 may be a non-transitory computer-readable storage medium.

While the computer-readable storage medium 624 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "controlling," "providing," "maintaining," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A system comprising:
a first valve;
a steam source located at a first height, the steam source to provide steam to an input of the first valve;
a condenser disposed at a second height that is at a higher elevation than the first height, the condenser having a water inlet, a steam inlet, and a water outlet;
a first pipe coupled between the steam source and the water inlet of the condenser, the first pipe comprising a slug intake bend;
a second pipe coupled between a top portion of the first pipe and the steam inlet of the condenser;
a second valve coupled to the slug intake bend and a cold water source, wherein the second valve is controlled to inject a first amount of cold water into the slug intake bend, wherein the first valve is controlled to inject the steam into the first pipe, wherein the steam pushes the first amount of cold water as a slug of water through a vertical portion of the first pipe upwards to the water inlet of the condenser, the vertical portion corresponding to the second height, wherein the steam in the first pipe enters the second pipe to be input into the steam inlet of the condenser; and
a third pipe coupled between the water outlet of the condenser and an input of a turbine located at a lower elevation than the condenser, wherein liquid water in the condenser flows through the third pipe to the input of the turbine when output from the water outlet of the condenser.

2. The system of claim 1, further comprising the turbine, wherein the turbine is located below the condenser, wherein the third pipe is a vertical pipe coupled to a bottom of the condenser and a top portion of the turbine, and wherein the liquid water spins the turbine to generate electrical power.

3. The system of claim 1, wherein the steam source comprises a drum fueled by injections of hot water from a reservoir of hot water, wherein the drum is configured to maintain a first pressure, wherein the condenser is configured to maintain a second pressure corresponding to a saturation pressure of cold water from the slug of water mixed with condensate, the second pressure being lower than the first pressure, wherein the steam from the drum, when allowed by the first valve, expands against the second pressure at the condenser, pushing the slug of water up the first pipe and into the condenser, and wherein water from the slug of water is mixed with the steam coming into the condenser, cooling and condensing the steam and maintaining the second pressure in the condenser.

4. The system of claim 3, wherein the steam source comprises a throttling drum that is elevated at a third height that is substantially similar to a fourth height of the slug intake bend.

5. The system of claim 4, wherein the fourth height of the slug intake bend is a maximum height so that a second difference between the second pressure and a third pressure of the cold water source is sufficient to propel the first amount of cold water into the slug intake bend without mechanical assistance.

6. The system of claim 4, wherein the steam source further comprises:
   a third valve coupled to an inlet of the throttling drum;
   the reservoir of hot water;
   a fourth pipe coupled to the third valve and the reservoir of hot water; and
   a pump to pump hot water from the reservoir of hot water to a higher pressure than a saturation pressure corresponding to a temperature of the reservoir of hot water, wherein the third valve is controlled to provide the injections of inject the hot water into the throttling drum at a beginning of a cycle.

7. The system of claim 6, further comprising:
   a disposal sink;
   a fourth valve; and
   a fifth pipe coupled between the throttling drum and the disposal sink, wherein the disposal sink is located below the throttling drum, wherein the fourth valve is controlled to remove liquid water from the throttling drum at an end of the cycle.

8. The system of claim 4, wherein the slug intake bend is a U-shaped bend in the first pipe adjacent to and above the throttling drum, wherein a timing and a duration of the second valve is controlled to inject the first amount of cold water into the slug intake bend without a pump as the slug intake bend, at a time of injection, is at a third pressure lower than the second pressure of the cold water source.

9. The system of claim 1, wherein the condenser is a jet condenser comprising a top compartment and a bottom compartment, wherein, when cold water from the slug of water enters the top compartment, the condenser is to spray a mist of water from the slug of water into the bottom compartment in which the steam is input from the steam inlet, wherein the liquid water in the condenser flows through the third pipe and enters the turbine, and wherein the liquid water spins the turbine to generate electrical power.

10. The system of claim 7, further comprising an air pump to expel non-condensable gases in the condenser to atmosphere.

11. The system of claim 7, further comprising an air pump to create a vacuum in the first pipe.

12. The system of claim 1, wherein the cold water source comprises a reservoir of cold water, wherein the reservoir of cold water is located at a base of the turbine, wherein the turbine outputs the liquid water to the reservoir of cold water after use.

13. The system of claim 1, further comprising a control box, the control box comprising a processing device to execute operations to:
   determine the first amount of cold water to be injected into the slug intake bend;
   determine a first timing of an injection of the first amount of cold water into the slug intake bend;
   determine a second amount of hot water to be injected into a throttling drum of the steam source;
   determine a second timing for ejecting a third amount of steam from the throttling drum into the first pipe; and
   determine a third timing for ejecting water from the throttling drum.

14. The system of claim 13, wherein the processing device is to execute a control algorithm to determine the first amount of cold water and the second amount of hot water to be injected, respectively, based on variables comprising at least one of a temperature of the steam source, a temperature of the cold water source, a temperature of atmosphere, and a specified power generation requirement.

15. A heat engine comprising:
   a hydro-electric turbine;
   a steam source configurable to generate steam from a hot water source;
   a condenser; and
   a slug intake bend in a first pipe coupled between the steam source and the condenser, the slug intake bend configurable to receive a slug of water from a cold water source, wherein the steam from the hot water source pushes the slug of water up a vertical distance to the condenser, wherein the condenser is configurable to receive the slug of water and the steam, condense the steam by mixing the steam with the slug of water, and output liquid water from the condenser to power the hydro-electric turbine.

16. The heat engine of claim 15, wherein the hydro-electric turbine, the steam source, and the slug intake bend are above ground level, and wherein the condenser is located above the hydro-electric turbine, the steam source, and the slug intake bend, wherein the liquid water flows from the condenser down a height through a second pipe to spin the hydro-electric turbine to generate electrical power.

17. The heat engine of claim 15, wherein the hydro-electric turbine and the steam source are below ground level and the condenser is located above ground level, wherein the condenser is located at a height above the hydro-electric turbine, and wherein the liquid water flows from the condenser down the height through a second pipe and enters the hydro-electric turbine to spin the hydro-electric turbine to generate electrical power.

18. A method comprising:
   controlling, by a processing device of a control box of a heat engine, a first valve to inject a first amount of cold water from a cold water source into a slug intake bend of a first pipe coupled between a steam source and a water inlet of a condenser;
   controlling, by the processing device, a second valve to inject a first amount of steam, fueled by a hot water source, into the first pipe to push the first amount of cold water as a slug of water through a vertical portion of the first pipe upwards to the water inlet of the condenser, wherein the first amount of steam enters a steam inlet of the condenser; and
   controlling, by the processing device, a third valve to allow liquid water from a water outlet of the condenser to flow through a second pipe to an input of a hydro-electric turbine, and wherein the liquid water spins the hydro-electric turbine to generate electrical power.

19. The method of claim 18, wherein the steam source comprises a throttling drum, a pump, a third pipe, a disposal sink, a fourth valve and a fifth valve, and wherein the method further comprises:
   controlling, by the processing device, the pump and the fourth valve to inject hot water into the throttling drum at a beginning of a cycle; and
   controlling, by the processing device, the fifth valve to remove water from the throttling drum at an end of the cycle.

20. The method of claim 19, further comprising:
determining, by the processing device, the first amount of cold water to be injected into the slug intake bend by the first valve;
determining, by the processing device, a first timing of injection of the first amount of cold water into the slug intake bend by the first valve;
determining, by the processing device, a second amount of hot water to be injected into the throttling drum by the fourth valve; and
determining, by the processing device, a second timing of injection of a third amount of steam into the first pipe by the second valve.

* * * * *